(12) United States Patent
Richter

(10) Patent No.: US 7,763,807 B2
(45) Date of Patent: Jul. 27, 2010

(54) CONNECTOR BOX FOR SOLAR PANEL

(75) Inventor: Michael Richter, Schalksmühle (DE)

(73) Assignee: Lumberg Connect GmbH, Schalksmuhle (DE)

(*) Notice: Subject to any disclaimer, the term of this patent is extended or adjusted under 35 U.S.C. 154(b) by 57 days.

(21) Appl. No.: 12/277,472

(22) Filed: Nov. 25, 2008

(65) Prior Publication Data

US 2010/0068921 A1 Mar. 18, 2010

(30) Foreign Application Priority Data

Nov. 27, 2007 (DE) ........................ 10 2007 057 021

(51) Int. Cl.
*H01R 4/70* (2006.01)
(52) U.S. Cl. .................... 174/138 F; 220/375; 439/718
(58) Field of Classification Search ................. 439/718, 439/135, 136; 220/200–380, 375; 174/138 F, 174/59, 60
See application file for complete search history.

(56) References Cited

U.S. PATENT DOCUMENTS 6,766,918 B1 * 7/2004 Bogdanovich .............. 220/375
7,220,137 B1 * 5/2007 Liu ............................ 439/136

FOREIGN PATENT DOCUMENTS

| DE | 7519716 | 1/1976 |
|---|---|---|
| DE | 29616804 | 10/1997 |
| EP | 0736941 | 10/1996 |
| EP | 1058362 | 12/2000 |
| FR | 2855333 | 11/2004 |
| WO | WO 2007/072519 | 6/2007 |

* cited by examiner

*Primary Examiner*—Phuong K Dinh
(74) *Attorney, Agent, or Firm*—Andrew Wilford

(57) ABSTRACT

An electrical connection box has a base adapted to be connected to a back face of a solar panel and a cover fittable with the base to form therewith a generally closed and weather-tight interior. The cover and base have inner surfaces that confront each other when the cover is fitted to the base. Respective eyes on the inner faces are each formed with an eye having a throughgoing hole of predetermined maximum diameter. A flexible tether cord has a pair of ends and is formed unitarily at each end with at least one arm extending back from the end along the cord at an acute angle to the cord and having a free end spaced from the cord and defining therewith a width greater than the maximum diameter. The tether passes through the holes with each arm engageable with a face of the respective eye.

6 Claims, 3 Drawing Sheets

CONNECTOR BOX FOR SOLAR PANEL

FIELD OF THE INVENTION

The present invention relates to a solar panel. More particularly this invention concerns a connector box for such a panel.

BACKGROUND OF THE INVENTION

A connector box for a photovoltaic solar panel is mounted on the rear face of the photovoltaic panel and houses connectors that connect to the panel conductors and that conduct away the electricity produced by the solar panels to the feeder arrangement for the electricity grid. Such a housing is divided into at least two parts, namely a cover and a base.

Such a connector boxes usable with a photovoltaic panel is known from the prior art, for example German 296 16,804 and 75 19 716, EP 0 736 941 and 1 058 362, and French 2 855 333. As a rule, they consist of at least two housing components, namely a cup-shaped base in which various connector and control elements are mounted, and a cover that locks onto this base.

The connector box is as a rule mounted on the rear face of a solar panels, most often glued in place. Foil-like ribbon conductors carrying electricity generated by the solar panel and to be fed into a supply line are routed into the connector box and retained there by connecting terminals. Also routed into the connector box are ends of the supply lines which, if required, are also connected to the foil conductors with normal construction components by clamp or screw contacts.

Extremely high demands on longevity are made on connector boxes of this generic type. A connector box must have at least the predicted minimum life of a solar panel, as a rule 25 years, remain undamaged by the effects of weather, such as strong temperature fluctuations, exposure to sun and similar, as well as withstand environmental influences, for example, air pollutants.

In the prior art, covers and bases are primarily connected with one another by expensive hinges or are made as two parts that are not coupled with one another when the box is open. For reasons of ease of assembly, but also based on regulations and standards, however, a connection coupling the cover and base of the connector box is desired or required.

OBJECTS OF THE INVENTION

It is therefore an object of the present invention to provide an improved connector box for solar panel.

Another object is the provision of such an improved connector box for solar panel that overcomes the above-given disadvantages, in particular that does not need an expensive a hinge arrangement, but which simultaneously guarantees the high demands of being weather-proof.

A further object is to provide such a box that is readily mass produced.

SUMMARY OF THE INVENTION

An electrical connection box has according to the invention a base adapted to be connected to a back face of a solar panel and a cover fittable with the base to form therewith a generally closed and weather-tight interior. The cover and base have inner surfaces that confront each other when the cover is fitted to the base. Respective eyes on the inner faces are each formed with an eye having a throughgoing hole of predetermined maximum diameter. A flexible tether cord has a pair of ends and is formed unitarily at each end with at least one arm extending back from the end along the cord at an acute angle to the cord and having a free end spaced from the cord and defining therewith a width greater than the maximum diameter. The tether passes through the holes with each arm engageable with a face of the respective eye and preventing pulling of the respective end back through the respective hole. The tether cord is wholly contained in the interior when the cover and base are fitted together.

This construction of the box is less expensive and connects the cover and the base without a complex mechanical joint. This embodiment principally has significant advantages for closing the box. For example, this embodiment makes it possible to evenly press the gaskets that are located in the cover section onto the base while fitting on the cover. In the case of a hinged joint, the gasket is sequentially crushed between the cover and base during the folding-like closing process. In so doing, the gasket deflects in the direction of the still open sections of the connector box so that after the conclusion of the locking process an even contact pressure between cover and gasket is not assured.

Otherwise, cover and base are permanently connected together so that the connector box can be manufactured as a single unit. Even in the assembly and maintenance of the connector elements the cover can be easily removed from the base without, however—as in connector boxes without connection between cover and base being set aside and possible lost.

As the flexible tether element is contained inside the box when the box is closed, it can be made of a comparably inexpensive material, for example, polyamide, on which high demands with respect to being weather-proof and resistant against environmental influences must not be made. This is because the tether element is protected from the influences of weather and the like to which the connector box is exposed.

Particularly preferred is an embodiment in which the cover and base form eyes in the interior, into which the flexible tether element engages, particularly when the eyes are made unitarily with the cover and/or base of the connector box. The retention means can easily be introduced into such eyes and fastened securely to the cover as well as at the base. Connector boxes made of plastic have proven themselves in particular, especially those made of polycarbonate or out of polyphenyloxide (PPO), particularly made in an extrusion process, as both plastics are markedly weather-resistant. In an alternative embodiment the tether element is made of the same material as the cover and the base of the connector box, even unitarily with one or the other.

Finally, the tether element can be provided with at least one, preferably however two, arms at its ends that pass through the eyes, that form arrow-like end sections jointly with the ends of the tether element, and that are only connected with the tether element at the respective arrow tip. The distance of the free arm ends to one another is larger than the width of the respective eye.

Such a plastic tether, for example, is a plastic monofilament or small plastic band that can simple be put through the eyes with its two ends. This way the two arms abut the plastic cord during the insertion process and after having gone through the opening of the eye move back in to their original position with reset resilience. These then engage behind the opening of the eye like a barbed hook.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
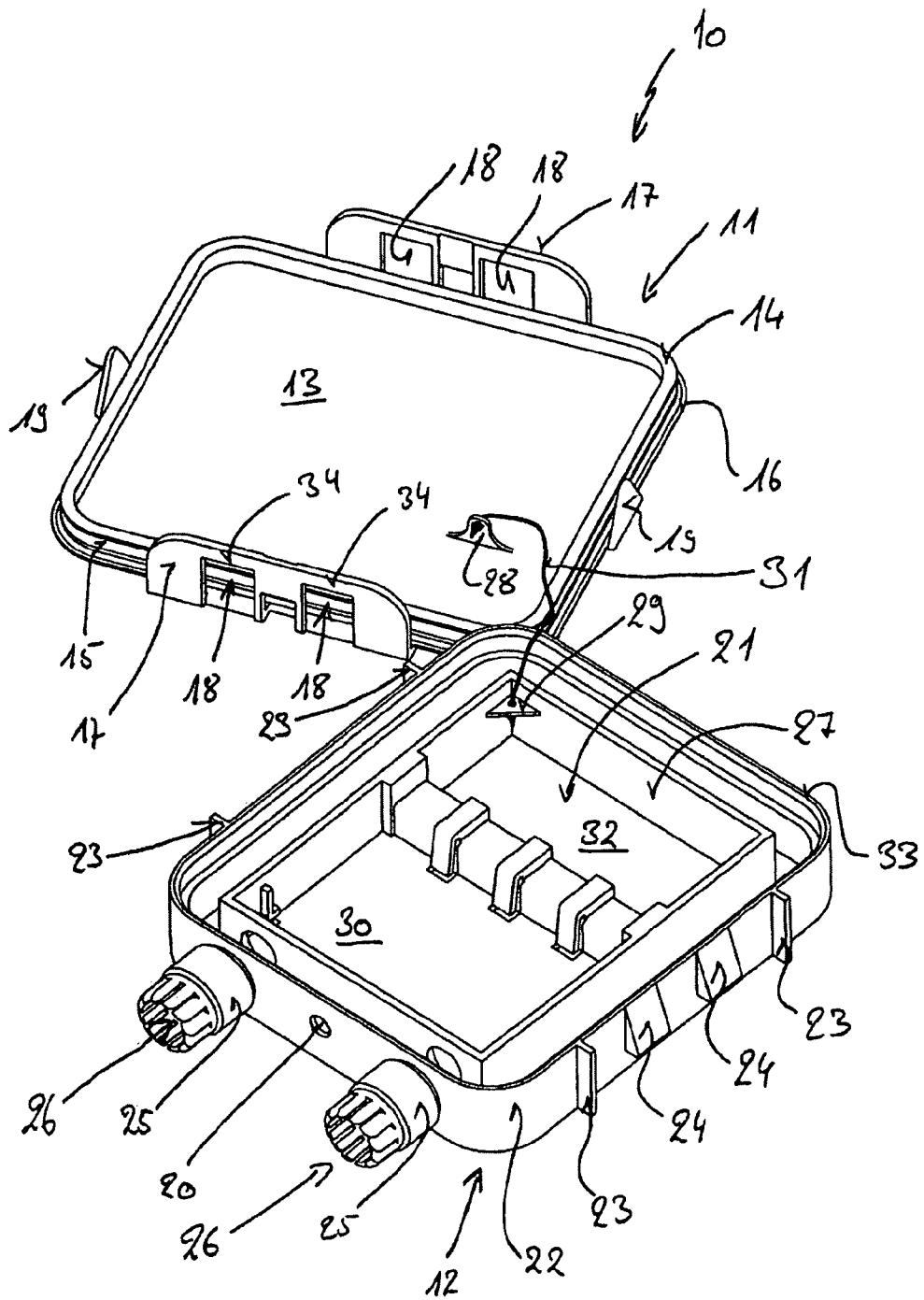
FIG. 1 is a perspective top view of the connector box according to the invention in the open position.
Figure 2:
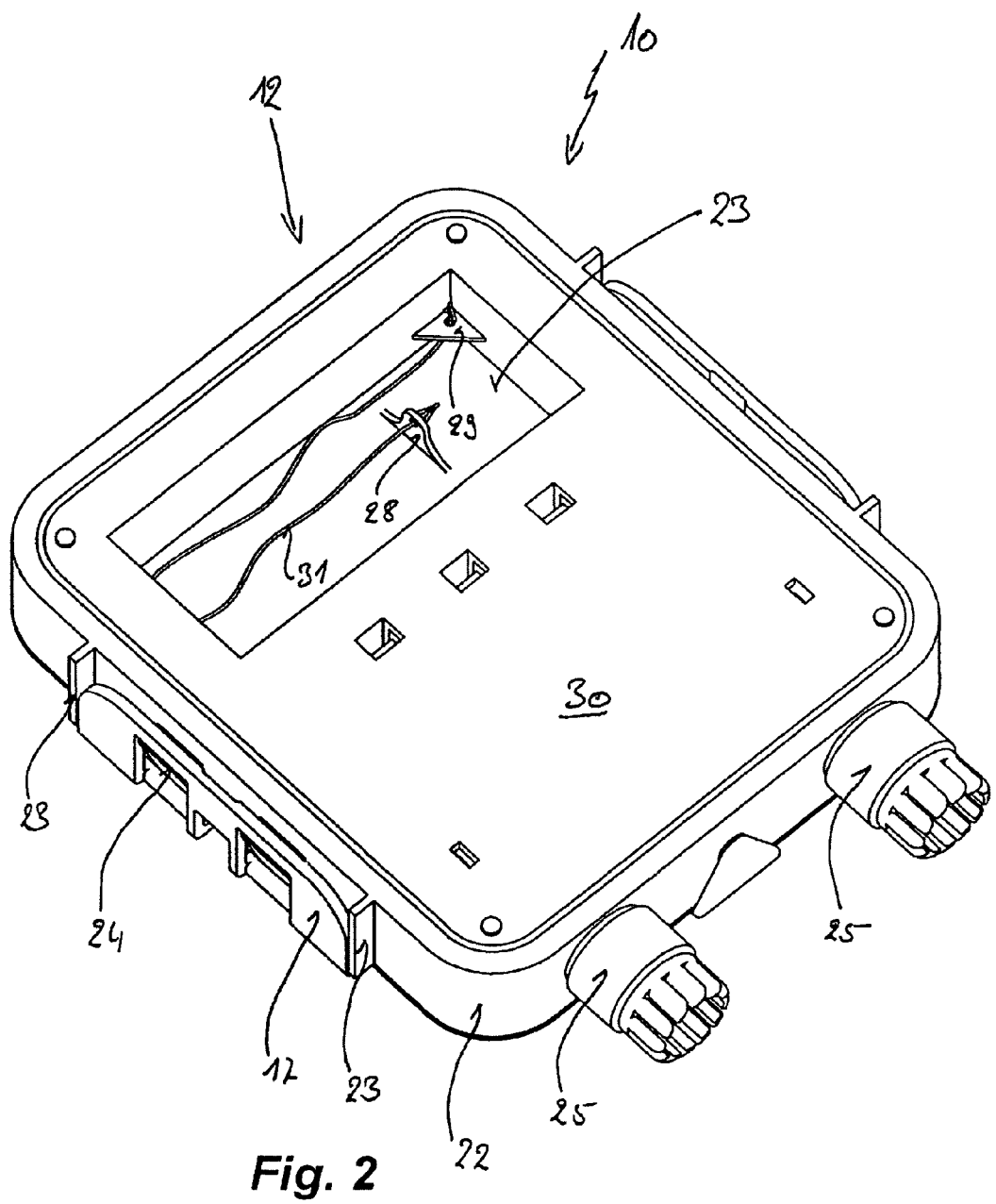
FIG. 2 is a perspective back view of the box in the closed position.
Figure 3:
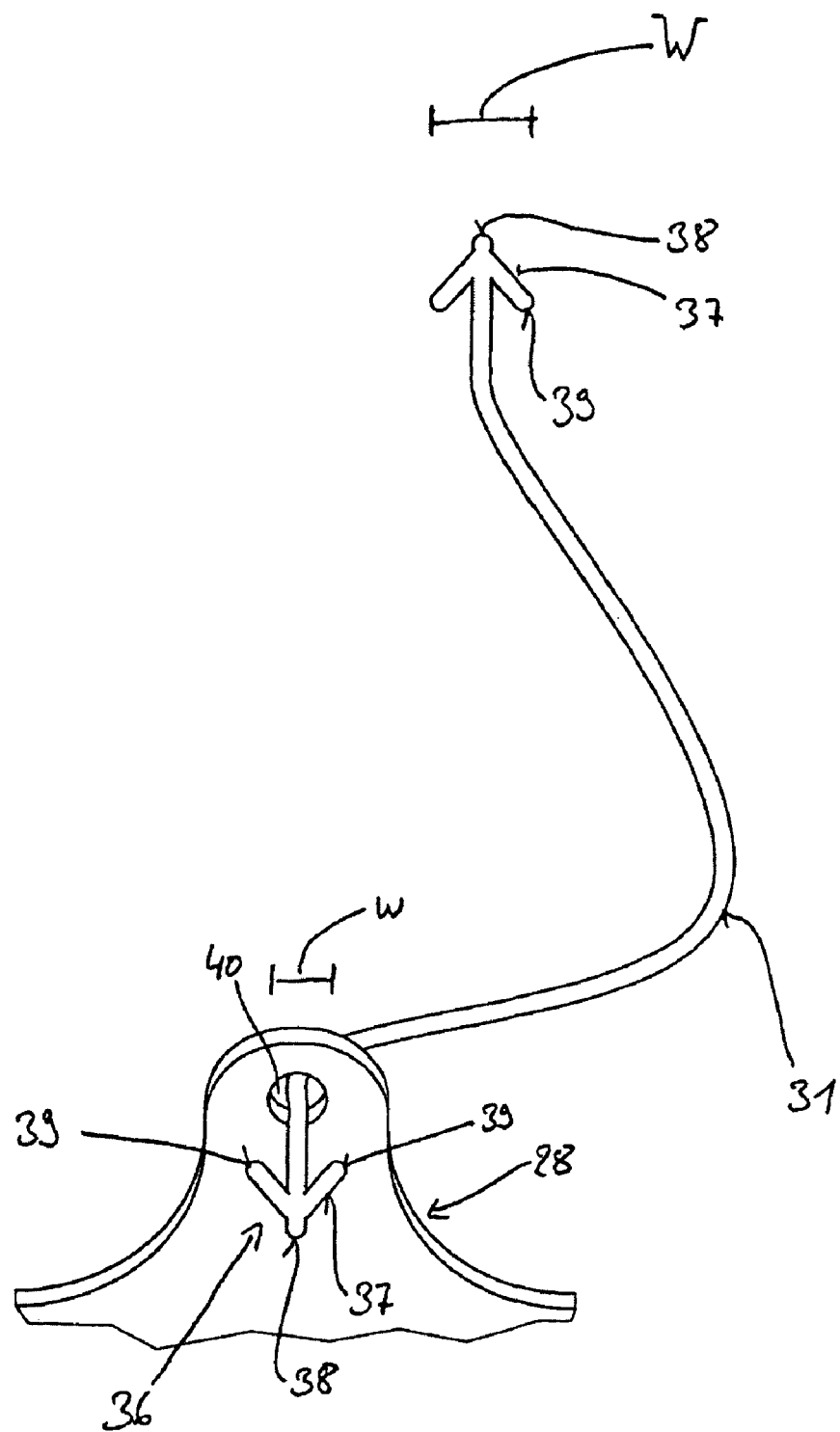
FIG. 3 is a large-scale view of a detail of this is invention.

FIGS. 1-3 show a connector box 10 for mounting on the rear of an unillustrated photovoltaic panel. It has two components, namely a basically rectangular cover 11 and an complementary cup-shaped base 12. The cover 11 is shown in FIG. 1 and has a planar panel 13 surrounded by an annular ridge or collar 14. The collar 14 is provided with a slot on its outer face, into which a circular gasket ring 15 is fitted. A flange edge 16 of the panel 13 projects outward in the plane of the panel 13 slightly past the collar 14. Opposite long edges of the cover 11 carry respective fastening tabs 17 each defining a pair of openings 18 that serve to fasten cover 11 to the base 12. The short sides of the cover 11 are provided with tabs 19 that in the closed position of the cover 11 block climate-control openings 20 formed in the base 12.

The base 12 formed an interior space 21 that communicates with the exterior only through the above-mentioned climate control openings 20 even when connector box 10 is closed. The base has an annular collar 22 that forms the interior space 21 and that is formed on its outside surface on each long side with a pair of guide ridges 23 that are parallel, spaced apart, and perpendicular to the plane of the box 10. Between each pair of ridges 23 are two triangular lugs 24 that can fit in the openings 18. Two feed fittings nipples 26 that are each provided with a strain relief 25 allow supply lines to pass through the collar 22 into the interior space 21. The interior space 21 in turn has a rectangular holder frame 27 for mounting contacts and control elements that are not shown.

The inner face of the panel 13 of the cover 11 is unitarily formed with a first eye 28 within the perimeter defined by the frame 27 and another such eye 29 is formed inside a corner of this frame 27, which could be provided elsewhere, for instance on an inner surface of the collar 22 or on an inside face of a panel 30 of the base 10. As also shown in FIGS. 2 and 3 a flexible plastic cord joins these eyes 28 and 29 to permanently secure together the cover 11 and base 12. The bottom surface 30 is formed with a cutout 32 that is open outward toward the solar panel and through which the ribbon conductors of the solar panels are brought into the connector box 10 so the generated is electricity can be conducted away.

FIG. 2 shows the connector box 10 when closed. In order to close it, first the cover 11 is positioned in such a way relative to the base that the fastening tabs 17 fit between the guide ridges 23 on the respective sides of the base 12. The cover 11 is then pressed against the base 12, so the fastening tabs 17 glide over the lugs 24 whose outer surfaces are angled outward toward the panel 39. Finally, collar 14 fits inside the interior space 21 of the base 12 so the gasket 15 bears outward on the collar 22, closing the connector box 10 airtight. When the edge of the flange 16 of the cover 11 abuts an edge 33 of the collar 22 that points away from floor panel 30, the stop notches 24 fit into the respective clip openings 18 of the fastening tabs 17 of the cover 11 so they snap resiliently inward against the collar 22 and the stop lugs 24 engage behind stop bars or webs 34 of the fastening tabs 17. The cover 11 is thus safely retained on the base 12.

FIG. 3 shows the plastic cord 31 in a schematic representation which passes through an eye 28 that is shown as an example and that is substantially identical to the eye 29 in FIG. 1. The plastic cord 31 is formed unitarily at its ends 36 with two arms 37 forming an arrow shape, that is extending at about 90° to each other and bisected by the cord 31. The arms 37 are only connected with the plastic cord 31 at the tip of the arrow 38 so free ends 39 of the arms 37 are spaced apart by a width or distance W that is larger than the width w or maximum diameter of an opening 40 of the eye 28.

To connect the cover 11 with the base 12 with the plastic cord 31 as in FIGS. 1 and 2, the ends 37 of the plastic cord 31 are pushed through the openings 40 of the eyes 28 and 29, the tip of arrow 38 first. In doing so, the small opening 40 as compared to distance W pushes the free ends 39 of arms 37 together toward the plastic cord 31. After the free arm ends 39 pass through the opening of eye 40, they spring elastically back into their starting position with and thus engage the opening of eye 40 from behind like a barb. This way the plastic cord 31 cannot pull out of eye 36. This way, the previously unconnected parts 11 and 12 of the connector box are held together. Instead of the two arms 37 that are shown here in simplified manner, that ends 36 can be provided with several arms 37 that are mounted funnel-like in order to improve retention of the cord 31 in the eye 28 or 29.

In a further embodiment that is not shown, instead of two arms 37 that form one arrow tip, only one arm 37 can be mounted at the end 36. In turn, it is also conceivable that only one end 36 is designed like a barbed hook, i.e. is provided with one or several arms 37. The other end would then be anchored on the cover 11 or base 12, for example by a bond or integral connection.

I claim:

1. An electrical connection box comprising:
a base adapted to be connected to a back face of a solar panel;
a cover fittable with the base to form therewith a generally closed and weather-tight interior, the cover and base having inner surfaces that confront each other when the cover is fitted to the base;
respective eyes on the inner faces and each formed with an eye having a throughgoing hole of predetermined maximum diameter; and
a flexible tether cord having a pair of ends and formed unitarily at each end with at least one arm extending back from the end along the cord at an acute angle to the cord at the arm end and having a free end spaced from the cord and defining at the end a width greater than the maximum diameter, the tether passing through the holes with each arm engageable with a face of the respective eye and preventing pulling of the respective end back through the respective hole, the tether cord being wholly contained in the interior when the cover and base are fitted together.

2. The electrical connection box defined in claim 1 wherein the eyes are respectively unitarily formed on the inner faces with the cover and base.

3. The electrical connection box defined in claim 1 wherein the cover and base are made of polycarbonate or polyphenylene oxide.

4. The electrical connection box defined in claim 1 wherein the tether cord is made of polyamide.

5. The electrical connection box defined in claim 1 wherein the ends of the tether chord are each formed with a pair of such arms forming a V and generally symmetrically flanking the respective strand end, the respective width being defined between the free ends.

6. The electrical connection box defined in claim 1 wherein the cover fits snugly with the base and is provided with fastening formations that resiliently lock the cover to the base.

* * * * *